United States Patent [19]

Avignon et al.

[11] Patent Number: 5,191,346
[45] Date of Patent: Mar. 2, 1993

[54] DEVICE FOR MEASURING THE DISTANCE TO A RUNWAY FOR AN AERIAL VEHICLE

[75] Inventors: Bruno Avignon, Palaiseau; Yves Canal, Le Plessis Robinson, both of France

[73] Assignee: Thomson TRT Defense, Paris, France

[21] Appl. No.: 706,003

[22] Filed: May 28, 1991

[30] Foreign Application Priority Data

Jun. 1, 1990 [FR] France .................... 90 06878

[51] Int. Cl.⁵ .................. G01S 13/42; F42C 13/04
[52] U.S. Cl. ......................... 342/61; 342/68; 342/128; 342/192
[58] Field of Search ........ 342/68, 122, 128, 142, 342/61, 62

[56] References Cited

U.S. PATENT DOCUMENTS 4,104,633  8/1978  Donahue et al. .............. 342/93
4,679,748  7/1987  Blomqvist et al. ............ 244/3.19

FOREIGN PATENT DOCUMENTS 0322005  6/1989  European Pat. Off. .

OTHER PUBLICATIONS

IEEE Transactions on Geoscience and Remote Sensing, vol. GE-25, No. 3, May, 1987 "Observation of Sea Ice Using the 36-GHz Surface Contour Radar", L. S. Fedor et al.
Proceedings of IGARSS 1986, vol. III, Sep. 1986, "Techniques for Providing High Spatial Resolution From Radar Altimeters", H. D. Griffiths et al.
Proceedings of the IEEE vol. 70, No. 12, Dec. 1982, "Radar Signatures of Terrain: Useful Monitors of Renewable Resources" F. T. Ulaby.

Primary Examiner—Gilberto Barrón, Jr.
Attorney, Agent, or Firm—Oblon, Spivak, McClelland, Maier & Neustadt

[57] ABSTRACT

A device automatically measures a distance relative to the longitudinal axis of a runway to be destroyed. This device comprises: a radar transmitter-receiver, at least one depointed antenna, distance-measuring gates, a threshold circuit and a computer circuit.

10 Claims, 4 Drawing Sheets

DEVICE FOR MEASURING THE DISTANCE TO A RUNWAY FOR AN AERIAL VEHICLE

BACKGROUND OF THE INVENTION

1. Field of the Invention

This invention relates to a device for measuring the distance to a runway or landing strip for an aerial vehicle, and more particularly, to such a device which is easy to use, provides the most precise measurement possible, and is relatively inexpensive.

2. Background Discussion

To at least partially destroy a runway, there is generally recourse to two different techniques. The first technique comprises releasing bombs from a bomber. However, to obtain a certain effectiveness, it is necessary to release a large number of bombs, because it is very difficult for the pilot, even an experienced pilot, to determine with sufficient precision the suitable moment of release. The second technique comprises sending a guided missile, but it is complicated to use and costly.

SUMMARY OF THE INVENTION

One object of the present invention is to provide a device for measuring the distance to a runway or landing strip for an aerial vehicle which gives the most precise measurement possible, and which is the least costly possible and very easy to use.

The measuring device according to preferred embodiments of the present invention, which automatically makes the measurement of the distance to a runway, comprises a radar transmitter-receiver analyzing the ground by approximately rectangular zones whose orientation and position are made to vary.

According to one preferred embodiment of the invention, the distance-measuring device comprises, besides a radar transmitter-receiver, at least one depointed antenna having a small aperture angle at least in one direction approximately parallel to a roll axis of the vehicle equipped with the device, and signal processing circuits comprising distance-measuring gates, threshold circuits, and computer circuits, these computer circuits being provided to control, for example, the triggering and release of bomblets or the like from the vehicle to destroy the runway.

BRIEF DESCRIPTION OF THE DRAWINGS

This invention will be understood better from reading the detailed description of an embodiment, given by way of nonlimiting example, illustrated by the accompanying drawing, in which.

DETAILED DESCRIPTION OF THE PREFERRED EMBODIMENT

In the example described below, the measuring device of the invention is installed in, for example, an aerial vehicle, for example, a bomb or a cluster munition (carrying submunitions), but of course the invention is not limited to such an application. For example, this measuring device can be installed in various other aerial vehicles for destroying runways, such as rockets or missiles or the like.

The cluster munition carrying the measuring device of the invention is of, for example, the winged cylindrical container type containing explosive "bomblets" (submunitions) suitable for destroying targets such a runway. The bomb (cluster munition) is released from a transport aircraft at an altitude generally of less than 1 km. At release, a suitable device imparts a rotation to the bomb around the longitudinal axis of this bomb.

In the general case of the aerial vehicle carrying the measuring device of the present invention, it is necessary that at least the part of this vehicle supporting the antenna(s) of the measuring device of the present invention rotates around the roll axis of this vehicle. In any case, the launching or release of the aerial vehicle is performed only when it is known that a runway exists and will be overflown by the vehicle or is on a trajectory thereof.

To obtain the best effectiveness of destruction of the runway by the bomblets of the vehicle equipped with the measuring device, the angle of attack of the vehicle or bomb (i.e., the angle formed, in projection on the ground, between the trajectory of the bomb and the longitudinal axis of the runway to be destroyed), should be less than 90° and greater than about 10°, and the release distance (distance, measured from the ground, along the trajectory of the bomb, between the vertical line of the desired release site of the bomblets and the longitudinal axis of the runway) should have a well-determined value, in general less than about 1 km.

Figure 1:
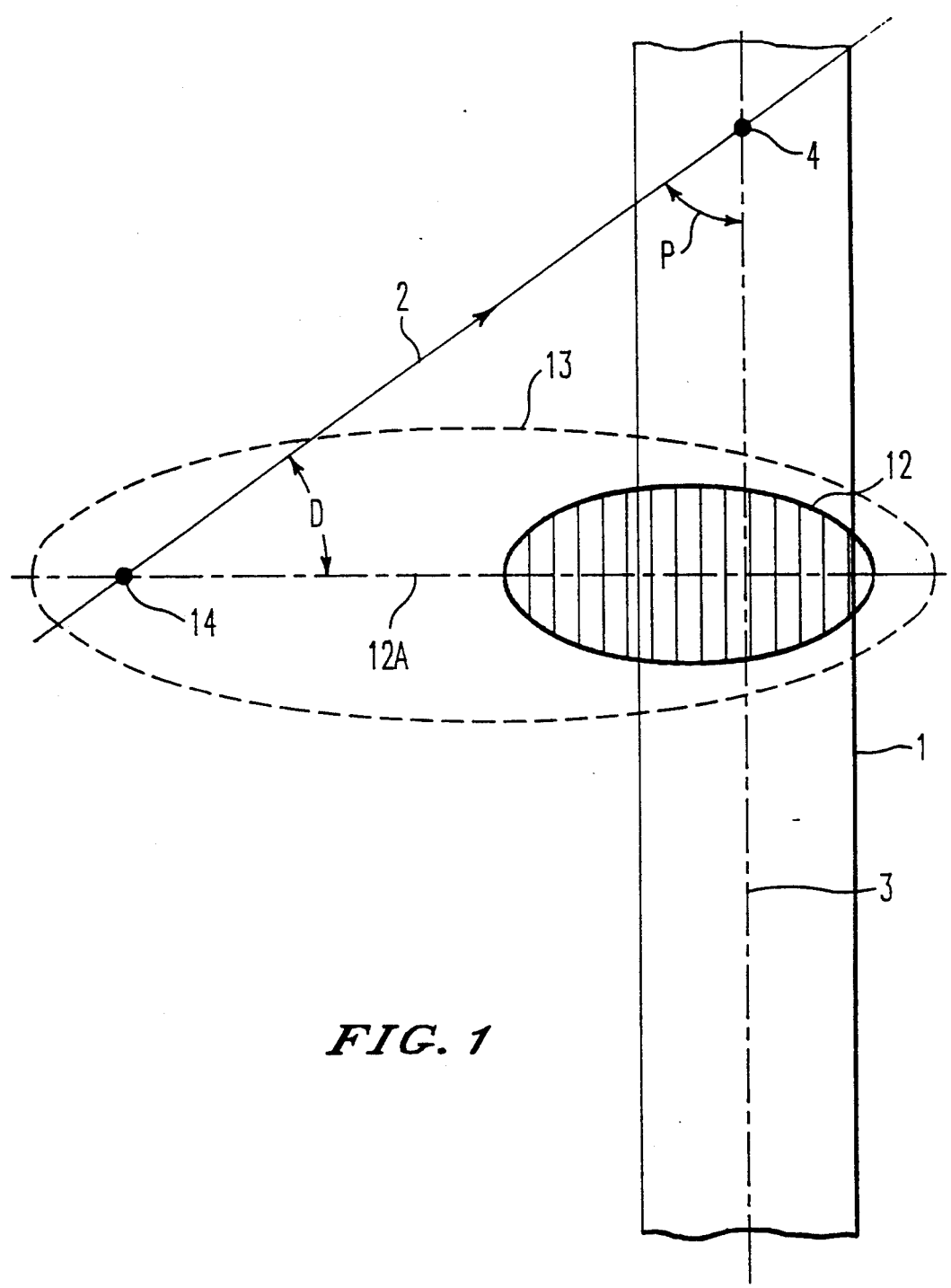
FIGS. 1 to 3 are simplified diagrams respectively provided to explain the operation of one embodiment of the device of the invention.

In FIG. 1, a portion of a runway 1 to be destroyed, and the projection of the trajectory 2 of a cluster munition, on the ground, are represented. The longitudinal axis of runway 1 is identified by reference numeral 3; and its intersection with trajectory line 2 is identified by reference numeral 4. Angle P formed by trajectory line 2 and longitudinal axis 3 is hereinafter called the "angle of attack" of the bomb to the runway 1. For a maximum destruction effectiveness, point 4 should be located on a central portion of runway 1, and the bomblets should land as close as possible to point 4.

Figure 2:
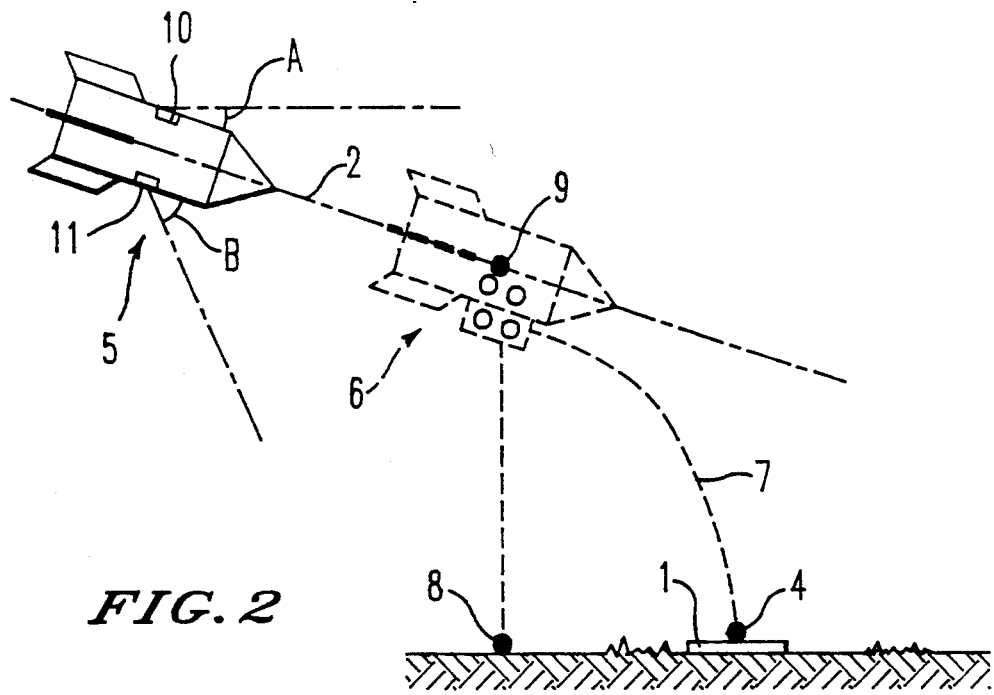

In FIG. 2, whose plane is that of a vertical plane containing trajectory line 2, a cluster munition or bomb, shortly before the release of its bomblets, is identified by reference numeral 5, and, in dashes, this same cluster munition, just at the moment of the release of its bomblets, is represented by reference numeral 6. Trajectory line 2 is illustrated as colinear with the roll axis of the bomb. Curve 7 in dashes represents the trajectory of the bomblets from their release point until their arrival on the ground. It is assumed for this figure that the trajectory or curve 7 ends at point 4, i.e., the triggering of the release of the bomblets has taken place at the right time.

The point on the ground which is directly beneath the release position 9 of the cluster munition is referenced 8. In most cases, the distance between points 8 and 4 is less than 1 km, and this distance is constant for the same type of cluster munition under similar conditions (speed of the carrier aircraft and release altitude can vary inside a range of values). In the present case, the release height (segment 8-9) can vary between about 100 and 1,000 m.

Bomb 5 is equipped with at least one depointed radar antenna. In the illustrated embodiment of FIG. 2, two depointed radar antenna 10, 11 are provided, depointed along different angles. In this example, angle of depointing A of antenna 10 is about 35°, and angle of depointing B of antenna 11 is about 55°, these differences in the angles being provided to be able to obtain data whatever the angle of attack of the bomb to the runway (under certain limits) may be.

The aperture angle of, for example, a conical beam, i.e., having a circular cross-section, of these two antennas 10, 11 is variable according to the applications. Its typical value is about 10° to 30°. In the present case, it is about 10°. These two antennas 10, 11 are directed toward the front off the bomb and are diametrically opposite.

According to an advantageous variant of this embodiment of the present invention, antennas 10 and 11 each emit a beam, which is not conical but flattened, i.e., having an oblong or ellipsoidal cross-section, the major axis of this section (corresponding to an aperture of the beam of about 90°) forming, with the longitudinal axis (roll axis) of the bomb, an angle approximately equal to the angle of depointing B of antenna 11.

Due to the fact that the bomb 5 rotates around its longitudinal roll or axis, the radar beam emitted by each of the antennas 10, 11 rotates around this axis. In the case of a conical beam, the "spot" or "footprint" that the beam forms on the ground is either a hyperbola (when the beam forms a small angle with the ground, but this case is of no interest here), or an ellipse such as ellipse 12 represented in FIG. 1. Because of the rotation of the bomb 5 around its roll axis, the major axis 12A of the ellipse 12, when it exists, forms a variable angle with longitudinal axis 3 of the runway 1.

In the case illustrated by FIG. 1, the position of the antenna is such that the major axis 12A of the ellipse 12 is virtually perpendicular to axis 3 of runway 1. To obtain a usable result (as explained below with reference to FIGS. 4 and 5), it is necessary that major axis 12A of ellipse 12 is be perpendicular to longitudinal axis 3 of the runway 1.

In the case where the radar beam has an oblong section, an ellipse is obtained such as ellipse 13 (shown in dashes in FIG. 1) which includes both the runway 1 and a point 14 which is directly beneath the bomb 5 at the time when this ellipse 13 is produced. The point 1 4 is used to measure the altitude of the bomb 5 at this moment.

The physical phenomenon on which the measurement made according to the invention is based is the difference in the amount of reflection of radar waves having a certain wavelength due to soils of different grain sizes. Actually, the grain size of the products used for the construction of runway 1 is generally less than 1 cm, while the grain size of the adjacent soil is greater than this value. Thus, if the wavelength of the radar waves is on the order of several centimeters, these waves are reflected by the soil adjacent to the runway and are not reflected by the runway.

Figure 4:
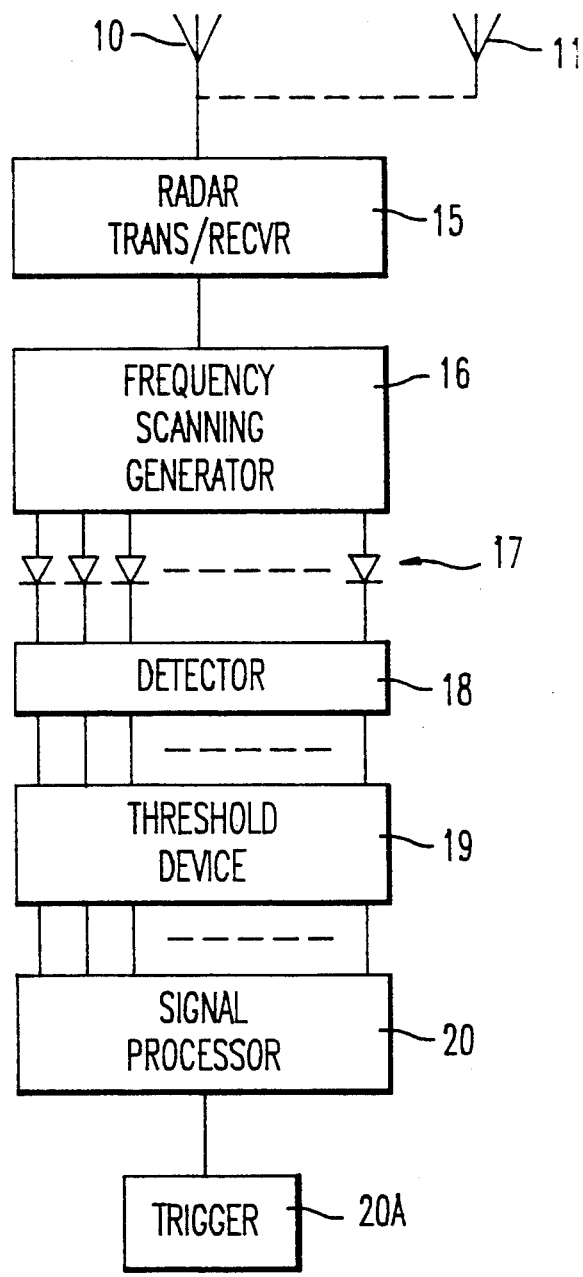
FIG. 4 is a block diagram of one embodiment of the device of the invention.

The measuring device of the present invention, diagrammatically represented in FIG. 4, comprises: a radar transmitter-receiver 15 connected to antennas 10 and 11, a frequency scanning generator 16, distance gates 17 (battery of band filters tuned to different frequencies close to one another and making it possible, in a way known in the art, to determine the distances of reflecting targets), a detector 18 for measuring the level of output of each of the gates of unit 17, a threshold device 19, and a circuit 20 for signal processing and calculation, whose output is connected to a device 20A for triggering the release of the bomblets.

Figure 3:
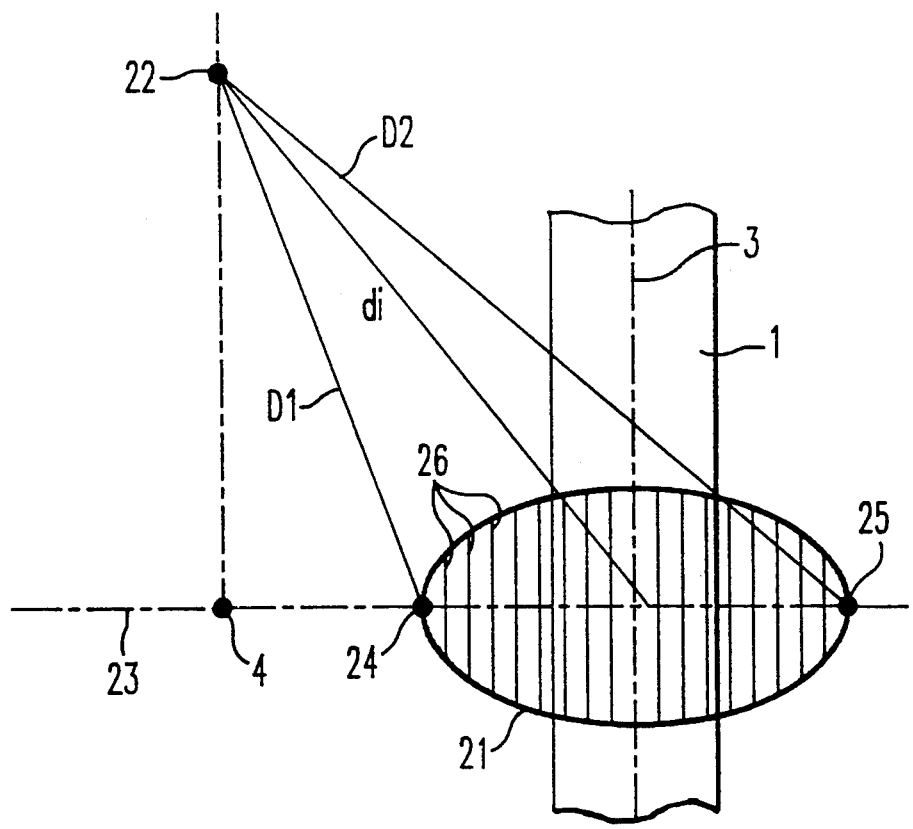

In FIG. 3, an ellipse 21 similar to ellipse 12 is shown, and the corresponding emitting radar antenna (10 or 11) has been represented by a point 22. The major axis of ellipse 21 is identified by reference numeral 23. The intersections of ellipse 21 with its major axis 23 are denoted at points 24 and 25. The distance between antenna 22 and point 24 is D1, and the distance between antenna 22 and point 25 is D2, point 25 being the farthest from antenna 22.

The distance between antenna 22 and an point inside ellipse 21 is between D1 and D2. Lines 26, equidistant from one another, of isodistances relative to antenna 22 have been plotted inside ellipse 21.

Since ellipse 21 is very elongated, these isodistant lines 26 are almost straight lines which are perpendicular to the major axis 23. The radial distance from antenna 22 to the bands delimited by the lines 26 is referenced di. The central frequencies of the various filters 17 are adjusted so that the various lines 26, corresponding to the boundaries between the bands of these filters, are approximately equidistant, with a pitch or spacing of between about 2 and 10 meters.

Figure 5:
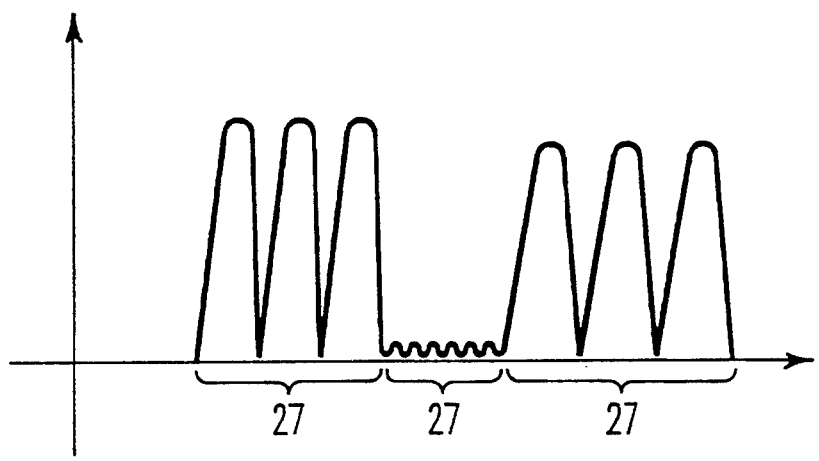
FIGS. 5 and 6 are diagrams of signals read in the device of FIG. 4.

When antenna 22 is oriented so that ellipse 21 overlies runway 1 by projecting on each side thereof, with its major axis 23 perpendicular to the longitudinal axis 3 of the runway 1, as represented in FIGS. 1 and 3, a signal such as shown in FIG. 5 is generated at the output of detecting circuit 18. This signal comprises a first part 27 corresponding to the echoes returned by the ground bordering runway 1 on the side of point 24. This part 27 comprises a succession of peaks at a rate of one per distance gate. Second part 28 of this signal comprises only noise, because runway 1 is not seen by the radar as a reflecting surface due to its specific roughness (the radar transmission frequency being chosen in a suitable way, as explained above). Third part 29 is similar to part 27 and corresponds to the echoes from the ground bordering the runway beyond point 25. Of course, the peaks of parts 27 and 29 adjacent to part 28 can have different amplitudes from those represented in FIG. 5, according to the degree of coverage of the edges of runway 1 by the bands of ellipse 21 delimited by lines 26.

Figure 6:
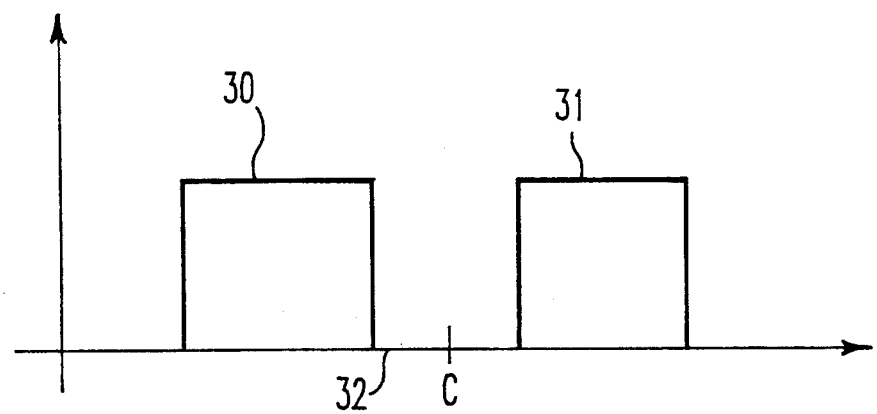

Threshold device 19 has a threshold adjusted slightly below the average amplitude of the summits of the peaks of parts 27 and 29. At the output of device 19, a signal such as the square signal of FIG. 6 is generated. This signal has, in the case illustrated by FIG. 6, two square waves 30, 31 corresponding to parts 27 and 29 of the signal of FIG. 5 if all the summits of the peaks are above said threshold. Space 32 of zero logic value between square waves 30 and 31 corresponds to part 28 of FIG. 5 and therefore, to the width of the runway pointed by the radar beam, which makes it possible to verify that this is indeed a runway if its width is sufficient.

After several measurements thus made, it is easy to determine the radial distance di from the bomb to the longitudinal axis 3 of runway 1 (middle of part 32 between parts 30 and 31) denoted by reference numeral C of FIG. 6. Knowing the altitude of the bomb (measured either with an independent standard altimeter or with the equipment described above and equipped with at least one antenna producing a spot or footprint on the ground such as spot 13) when the signal at the output of circuit 18 corresponds to that of FIG. 5, i.e., the major axis of ellipse (12, 21 or 13) is perpendicular to the axis 3 of runway 1, permits easy calculation of the distance between point 14 and the axis 3 of runway 1. Then the distance between point 14 and point 4 can be calculated by knowing angle D between trajectory 2 and the major axis 12A of the ellipse as shown in FIG. 1.

At the end of several measurements, it is easy to determine at what moment the distance of the bomb to point 4 will have the desired value (in this example, 250 meters) to trigger the release of the bomblets. Circuit 2 sends the suitable signal to device 20a for triggering the release when this desired value is reached.

In the case where antenna 22 emits a beam producing a spot such as spot or footprint 13 (FIG. 1) on the ground, the first peak of part 27 illustrated in FIG. 5 corresponds to the altitude of the antenna, since the altitude of one point in space relative to the ground is the shortest distance from this point to the ground and since the first peak of part 27 corresponds to the shortest distance between the antenna and the reflecting ground. This case is particularly advantageous because the same antenna makes it possible to make, during the same radar emission, a measurement of the altitude and a measurement of radial distance di to the axis 3 of the runway 1, which prevents the accumulation of errors in these two measurements.

Of course, the rotating depointed antenna can be replaced by any device making it possible to produce "spots" or "footprints" on the ground which are similar to the spots described above (such as the approximately rectangular zones delimited by the lines 26 in FIG. 3) whose orientation and position can vary.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A measuring device for measuring distance of an aerial vehicle, equipped with the measuring device, from a runway, comprising:
   a radar transmitter-receiver emitting at a frequency for generating echoes from ground bordering the runway, without generating echoes from the runway;
   means for processing the echoes from a plurality of approximately rectangular zones of the ground; and
   means for determining a distance of the approximately rectangular zones of the ground, which vary in orientation and position relative to the vehicle equipped with the measuring device, from the aerial vehicle.

2. A measuring device according to claim 1, wherein the wavelength of the radar emission is on the order of several centimeters.

3. A measuring device for measuring a distance of an aerial vehicle, equipped with the measuring device, from a runway, comprising:
   a radar transmitter-receiver for generating echoes from the ground;
   means for processing the echoes from a plurality of approximately rectangular zones of the ground; and
   means for determining a distance of the approximately rectangular zones of the ground, which vary in orientation and position relative to the vehicle equipped with the measuring device, from the aerial device, wherein the radar transmitter-receiver is connected to at least one depointed antenna and wherein the measuring device further includes means for rotating the at least one depointed antenna around a roll axis of the vehicle.

4. A measuring device for measuring a distance between an aerial vehicle, equipped with the measuring device, and a runway, the device comprising:
   a radar transmitter-receiver,
   at least one depointed antenna having a small aperture angle at least in one direction approximately parallel to a longitudinal axis of the serial vehicle, and
   signal processing circuits comprising: distance-measuring gates, threshold circuits, and computer circuits for triggering the release of at least one bomb carried by the aerial vehicle.

5. A measuring device according to claims 3 and 4, wherein the at least one depointing antenna comprises two depointed antennas each having a different depointing angle.

6. A measuring device according to claim 5, wherein the depointing angles are respectively about 35° and 55°.

7. A measuring device according to claim 4, wherein the vehicle is a cluster munition having bomblets and wherein the computer circuits include means for triggering the release of the bomblets when a distance, measured to the ground, from the cluster munition to an axis of the runway, parallel to a trajectory of the cluster munition, reaches a given value.

8. A measuring device for measuring a distance to a runway for an aerial vehicle, carrying at least one bomb, the device comprising:
   a radar transmitter-receiver for transmitting and receiving radar waves having a wavelength which prevents reflection from the runway;
   at least one antenna connected to the radar transmitter-receiver;
   means for rotating the at least one antenna around a longitudinal axis of the aerial vehicle;
   a frequency scanning generator;
   a battery of band filters tuned to different frequencies close to one another for determining distances of reflecting targets;
   a detector for measuring an output level of each of the band filter;
   a threshold device for determining if the output level of each of the band filters exceeds a predetermined threshold;
   signal processing and calculation means for processing measured output levels of each of the band filters, for calculating a distance to a non-reflecting region on the ground having a width sufficient to be the runway and for triggering the release of the at least one bomb for destroying the runway when a distance, measured to the ground, from the vehicle to an axis of the runway, parallel to a trajectory of the vehicle, reaches a given value.

9. A measuring device according to claim 8, wherein central frequencies of the band filters are adjusted so that lines, corresponding to the boundaries between the bands of these filters, are approximately equidistant.

10. A measuring device according to claim 9, wherein a distance between the lines is between about 2 and 10 meters.

* * * * *